United States Patent [19]

Erickson

[11] Patent Number: 4,885,352

[45] Date of Patent: Dec. 5, 1989

[54] TRANSPARENT PLASTIC FILM COMPRISING LOW DENSITY POLYETHYLENE

[75] Inventor: Laurence R. Erickson, Midland, Mich.

[73] Assignee: DowBrands Inc., Indianapolis, Ind.

[21] Appl. No.: 161,588

[22] Filed: Feb. 29, 1988

Related U.S. Application Data

[62] Division of Ser. No. 24,427, Mar. 11, 1987, abandoned.

[51] Int. Cl.$^4$ .................. B32B 27/32; C08F 110/02
[52] U.S. Cl. .................. 526/348.1; 526/352.2; 524/585; 428/332
[58] Field of Search .............. 264/556; 526/348.1, 526/352.2; 524/585; 428/332

[56] References Cited

U.S. PATENT DOCUMENTS

| | | | |
|---|---|---|---|
| 3,121,915 | 2/1964 | Heller, Jr. ........................... | 264/556 |
| 4,022,850 | 5/1977 | Booth et al. ....................... | 264/95 X |
| 4,327,009 | 4/1982 | Allen et al. ........................ | 524/114 |
| 4,367,256 | 1/1983 | Biel ...................................... | 428/218 |

FOREIGN PATENT DOCUMENTS

1066493  4/1967  United Kingdom ................ 264/556

*Primary Examiner*—Joseph L. Schofer
*Assistant Examiner*—F. M. Teskin

[57] ABSTRACT

The present invention teaches an oriented film and method for making the same. It has been found that an olefinic film, e.g. polyethylene, can be made with highly oriented crystalline phase unit cells. The film of the present invention has crystalline phase unit cells with an a-axis highly oriented in the machine direction and consequently, the improved physical properties. Specifically, the film has a good cutterbar tear, a high degree of puncture resistance and limited tear propagation in the transverse direction. The film is made by controlling the heat transfer of a chill roll to the olefinic extrudate. Heat transfer is accomplished by pinning the olefinic film with an air knife as it is extruded on the chill roll. The pin is controlled by adjusting the temperature of the chill roll and the focus velocity of th air knife.

4 Claims, 1 Drawing Sheet

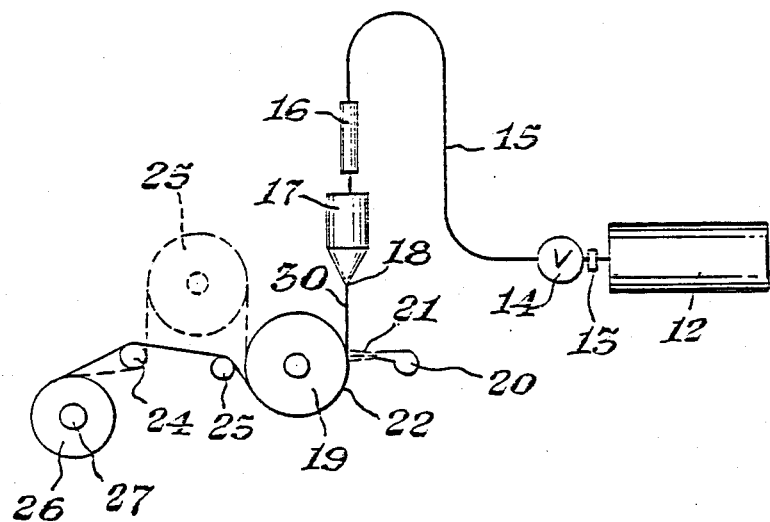

TRANSPARENT PLASTIC FILM COMPRISING LOW DENSITY POLYETHYLENE

This is a divisional of application Ser. No. 024,427, filed March 11, 1987, now abandoned.

BACKGROUND OF THE INVENTION

This invention relates to polymeric packaging film, more particularly to consumer plastic wrap made of polyolefins. Such films have cling wrap properties which are useful for households and shops such as for wrapping and display of foods in refrigerators.

Various materials and processes have been used in the manufacture of such films, the most common materials being polyvinylchloride (PVC) polyvinylidene chloride (PVDC) copolymer and polyolefins, such as polyethylene. However, conventionally made films suffer from various disadvantages and have not been completely satisfactory in use.

Polyvinylchloride film must be highly plasticized to possess high strength characteristics such as tensile strength, or puncture resistance. This high level of plasticizer can give a "chemical" flavor to food especially when used at elevated temperatures.

Polyethylene films made of a blend of high density polyethylene (HDPE) and low density polyethylene (LDPE) have good handling, as measured by two percent secant modulus. Such films, however, have low strength, which is measured by a puncture, propagation and tear (PPT) test. The low PPT value results in films that tend to tear in strips during dispensing and handling, which is problematic for consumer wraps.

Films made completely of LDPE usually have good optical properties and good tear resistance. However, such films have a low two percent secant modulus, i.e., below 25,000 psi. Low modulus films tend to be limp and hard to handle. The cling property in this type of film is typically enhanced by the use of a cling additive. These films are not preferred in market-research studies as good consumer "high-cling" films. Cling is defined as how well the films stay wrapped around foods such as sandwiches, and adhere to open containers such as glass bowls. Low modulus films often tangle and fold over on themselves which is exacerbated when a cling additive is in the films.

Consumers are also interested in the ease of dispensing and tearing off a sheet of film as it is withdrawn from the container in which the film is packaged. For this purpose, containers such as cartons are ordinarily provided with sharp edges, usually a saw-toothed edge known as a cutter bar. Manufacturers have attempted to comply with this consumer demand by supplying film that can be withdrawn from a container to a desired length and severed along the cutter bar with ease. Even at 0.5 mils thickness, low density polyethylene film and especially linear low density polyethylene film (LLDPE) is very difficult, and in some instances, impossible to tear off in the transverse direction of the film on conventional cutter bar strips. The film tends to elongate and considerable effort and energy are required to sever the film.

Accordingly, it is an object of this invention to provide a transparent plastic film of low density polyethylene which has high strength characteristics, good handling and easy cutter bar tear.

It is another object of this invention to provide a process for the production of films of olefinic resins having high strength characteristics, good handling and easy cutter bar tear.

SUMMARY OF THE INVENTION

The present invention is a transparent plastic film comprising (1) a homopolymer of ethylene having a density of between about 0.92 to about 0.94 and a melt index of between about 1 decigrams per minute to about 6 decigrams per minute, said film having an amorphous phase and a crystalline phase with polyethylene crystalline units, said polyethylene crystalline units having an a-axis orientation, as measured by IR trichroism, of $A_X/A_O$ between about 1.0 to 1.5; $A_Y/A_O$ between about 0.7 to 1.0; and $A_Z/A_O$ between about 0.7 to 1.0, whereby the film has high strength characteristics, good handling and easy cutter bar tear.

In another embodiment the invention also comprises a transparent plastic film comprising (1) a homopolymer of ethylene having a density of between about 0.92 to about 0.94 and a melt index of between about 1 decigrams per minute to about 6 decigrams per minute, said film having a good handling, e.g., a two percent secant modulus of greater than 172 Megapascals; good tear resistance, e.g., a Puncture, Propagation, and Tear of greater than 140 mN/$\mu$m (milliNewtons/micrometer); and easy cutterbar tear, e.g. a Tribfelner Cutterbar Test value of less than 0.4 Joules, whereby the film has crystalline unit cells with an a-axis highly orientated in the machine direction.

The present invention also comprehends a method for the production of a film of thermoplastic resin which comprises extruding through a die slit a molten olefinic resin in film form; and quenching the extrudate at a rate of between about 220° C./sec and about 19,000° C./sec.

DESCRIPTION OF THE DRAWING

The single FIGURE is a schematic flow diagram for the film quench method of the invention employed for producing olefinic film.

DETAILED DESCRIPTION

The present method was especially developed for the production of a novel low density polyethylene film, a specific material more fully characterized in the further description. However, it will be understood that the method according to this invention may be used for the extrusion of other polymeric films as well. Thus, the invention can also be employed in the extrusion of normally solid polymers of ethylenically unsaturated substances, such as thermoplastic polymers of mono-olefinic lower molecular weight, aliphatic hydrocarbons including polyethylene, polypropylene, copolymers and blends thereof, and the like.

Low density polyethylene useful in making up the extruded film of this invention generally comprises a homopolymer of ethylene having a density of from about 0.92 to about 0.94, preferably from about 0.928 to about 0.932. The melt index of the low density polyethylene is not narrowly critical generally within the range of about 1 to about 6 decigrams per minute, measured at 44 psi and 190° C. The polyethylene resin suitably has a melt index in the range of about 1 to about 6, and a density in the range of about 0.92 to about 0.94. Preferably, the melt index of the polyethylene resin is between about 2 to about 3 and the density is between about 0.928 to about 0.932.

The polyethylene employed may be virgin polyethylene polymerized from any conventional process such as by using a tubular or autoclave reactor; preferably, a tubular reactor is used to polymerize the polyethylene because the resin provided, upon being chill roll cast according to this invention, has increased tear resistance. From an economic perspective, film comprising up to 100% recycled polyethylene is preferably employed. The polyethylene may be recycled by most any conventional process.

The plastic film of this invention may optionally contain cling additives in an amount of between about 0.2 to about 2.0 weight percent of the film. Concentrations below about 0.2 weight percent would not ordinarily provide the film with sufficient cling characteristics. Concentrations above about 2.1 weight percent generally provide so much lubricant that processing of the blended film formation is difficult because the lubricant prevents melting and mixing of the resin. There are numerous compounds well known in the art which provide the cling characteristic in polyethylene films. These cling additives include, glycerol, mono-, or dioleate, glycerol isostearate, polyisobutylene, polyethylene oil, low molecular weight polyethylene, low molecular weight ethylene vinyl acetate, polypropylene glycol, fatty esters and vegetable oils. Preferably polyisobutylene is employed because it enhances the film strength and elasticity, gives better clarity with lower haze, and contributes good tear, gloss and cling properties.

Further, minor amounts of an antioxidant can be added to the film for stabilization. For example, IRGANOX 1076 antioxidant, commercially available from CIBA-GEIGY Corp., may be incorporated in amount in the polyethylene into the range of from about 200 to about 800 parts per million.

As is known in the art a variety of other additives may be added to the film including colorants, slip additives, cling additives, ultraviolet stabilizers, heat stabilizers, processing aids, gel scrubbing agents, and organic and inorganic fillers.

Molten polyethylene resin is provided from supply means 12, which may be a reactor which feeds the polyethylene directly into the quench film process or an extruder into which pelletized polyethylene is fed. Suitable additives may be mixed with the polyethylene in supply means 12 or at any convenient location along the manufacturing line. By "molten" is meant that the resin temperature is below the degradation temperature and above the temperature at which the extrudate tears during drawdown.

The molten synthetic thermoplastic film forming material is extruded from supply means 12 through, optionally, a filter 13, a conduit 15 to extrusion die 17, and through the die gap 18 at the end of the die 17. A metering pump 14 is advantageously employed before the die to push and/or uniformly extrude the resin through the die. A static mixer 16 or the like may also be provided before the die in order to knead the feedstock as uniformly as possible or to maintain as uniform a temperature distribution as possible. There can also be used a die of the structure in which the width of the die gap can be mechanically increased or decreased locally.

The desired characteristics for the polyethylene cling film of this invention are achieved by an improved film quenching method. Film quenching is generally well known in the art and comprises extruding the sheet of molten polymer through a slot die and then quenching the extrudate. As will be discussed in greater detail below, it has been found that, surprisingly, controlling the quench rate of the extrudate within the scope of this invention provides a film having a desirable balance of properties.

In the cooling of the film, a transverse "frost" line, or margin, appears in conventional cooling apparatus at a position downstream from the air knife. This line is ordinarily visible and it is the crystallization line denoting the general area of the stage of advance of the film by which crystallization of the polyethylene film has occurred. In the slot die cast extrusion process, the molten polymer starts in a completely disordered state. It has been found that controlling the quench rate of the molten film after discharge from the die will affect the crystallization and thus the morphology of the cooled film as evidenced by the "frost" line. The temperature control of this invention, which may involve ordinary heat addition to or slow cooling of the polymer material, must be applied after the die and before the "frost" line.

Upon exiting from the die 17, the extrudate 30 is quenched. The manufacturing line speed of the extrudate and drawdown distance are not narrowly critical, provided the extrudate issuing from the die is quenched while in a molten state. A short drawdown length creates a potential for cooling the film so rapidly that cooling ripples appear on the film. A long drawdown length is not suggested because the film is unsupported and can break. By "unsupported" is meant that the film is not backed, laminated, or otherwise reinforced by or secured to another sheet of film.

The quench rate of the molten extrudate effects the crystalline morphology of the film. For purposes of this invention the molten extrudate should be cooled by a quench rate of between about 220° C./sec and about 19,000° C./sec. Preferentially, the molten extrudate is cooled by a quench rate of between about 1100° C./sec and about 19000° C./sec. Quench rate is calculated by dividing the difference of the extrudate temperature and the film temperature at crystallization by the quench time. Quench time is determined by dividing the distance required to crystallize the extrudate on the casting surface by the line speed.

Quench rate may be controlled by a variety of known parameters such as casting the extrudate onto a cooled casting surface and, optionally, pinning the extrudate against the casting surface.

The molten extrudate 30 is fed into generally tangential contact with a casting surface. As the extrudate 30 is fed onto the casting surface, the casting surface is advanced at a somewhat higher rate of speed than the rate of extrusion of the film, thereby placing under tension and drawing the extrudate away from the source of extrusion.

For the purpose of this invention, any conventional casting surface may be employed, such as the surface of a driven rotary member. Suitable casting surfaces include various chill roll designs and casting belts. For purposes of illustration, the FIGURE shows the casting surface as chill roll 19.

The casting surface is cooled to provide quenching of the film-like extrudate. Preferably, the casting surface is cooled to a temperature of between about 25° C. (77° F.) to about 90° C. (194° F.). Most preferably, the casting surface is cooled to a temperature of between about 55° C. (131° F.) and about 77° C. (171° F.).

Any conventional chill roll is suitable for the purposes of this invention. Typically, the chill roll is metallic and hollow. It may be provided with a hollow shaft providing an inlet at one end and an outlet at the other end for circulating a cooling liquid internally thereof. Thus, the peripheral film-carrying chill roll surface is preferably uniformly cooled to the desired extent, which in turn also cools the extruded film as it contacts and advances along the arcuate peripheral surface of the chill roll.

As previously indicated, suitable means, i.e. drive means, are provided for rotating the cylinder in the direction of the arrow; a means should also be provided for controlling the speed thereof relative to the rate of feed of the film from the extrusion die so that the film is pulled away from the extrusion die and is thereby drawn to the desired gauge or thickness while in substantially fluid condition.

When the unsupported and rather fluid film initially contacts the casting surface, pressure is directed transversely across and against the advancing film at about its point of contact with the periphery of the cylinder.

The extrudate may be pinned to the casting surface to provide controlled quenching. Exemplary pinning techniques include supplying 21 from a fluid supply means a jet of fluid media 20 or the like which have a desired focus velocity; and a plurality of chill rolls which pinch the extrudate. Advantageously, the molten film may be pinned against the casting surface by a jet of air supplied from an air knife.

By "focus velocity" is meant that fluid pressure which is emitted from the jet. The jet should have a sufficient focus velocity and be positioned relative to the casting surface to evenly exclude the substantial entry of air between the casting surface and the extrudate. Focus velocity may be measured using a velocity probe positioned at a known distance from the jet outlet lip. This known distance should be the same as the positioning distance of the jet outlet lip to the casting surface. Advantageously, the focus velocity is up to about 6000 meters/min (m/min).

For the purposes of this invention, a film is defined as having a thickness of 2 $\mu$m (0.1 mil) to 250 $\mu$m (10 mils). To achieve maximum desired orientation effects, the film preferably has a thickness of from about 7 $\mu$m (0.3 mils) to about to 25 $\mu$m (1 mil).

As seen in the FIGURE, the film is carried on the surface 22 of chill roll 19, for an extended portion of its travel. The solidified film is drawn off the chill roll, e.g., over non-driven rollers 23 and 24, and, optionally, may be fed to a second casting surface, e.g. chill roll 25. The second casting surface does not affect crystallization of the film, but only cools the film web to ambient temperature to allow the film to be further processed. Generally, the second casting surface will be used when the temperature of the film coming off the first casting surface is above about 48° C. (120° F.).

The film may be submitted to further treatments to improve its physical properties. Such treatments are known in the art and they include longitudinal and transverse stretching, heat-setting, post-stretching, heat-relaxing and the like. Finally, the film is wound in a roll 26 supported on a suitable spindle reel 27 from which it may be dispensed for subsequent use.

It has been found that films made in accordance with this invention have balanced oriented crystalline phases and, consequently, possess improved physical properties compared to that of conventional polyethylene films. Specifically, polyethylene films of the present invention have crystalline unit cells with an a-axis highly oriented in the machine direction, i.e., in the direction of movement of the film.

Balanced tear resistance and modulus properties as well as good cutterbar tear are found when the average orientation of molecular chains in the a-axis of crystalline units is biased toward the machine direction.

Although not bound by theory, it is believed the crystallization rate is the source of the advantageous molecular orientation, which, in turn, is likely responsible for the preferred physical properties of the films of the present invention. Slower crystallization over a longer distance is believed to build a larger crystallite which can crosslink the melt and strengthen it. More orientation can then be expected to build up before the entire film becomes too rigid. Higher molecular orientation in the machine direction increases the tensile modulus and lowers the tear resistance.

Tearing and the propagation of that tear in plastic film is not well understood in molecular terms, particularly for semi-crystalline polymers above the glass transition temperature of the amorphous phase. Although not bound by theory it is believed that favorable orientation of the molecular chains is important since this increases the number of chains that must be ruptured for the dynamic puncture and propagation of that puncture resulting in a tear. Slippage of chains and the effectiveness of low density polyethylene crystallites in transferring stress are also important for proper tearing and the propagation of that tear.

A number of known techniques are suitable for analyzing the orientation of the molecular structure of the film. Exemplary techniques include infrared (IR) trichroism, x-ray diffraction, birefringence, and IR dichroism.

IR trichroism is the preferred technique because of its completeness and reproducibility of results. The average orientation of molecular chain axes in both the crystalline and amorphous phases of polyethylene films is measured, using IR trichroism, by absorption bands in the infrared spectrum. Identification of these indicator bands is achieved by studying the spectra of the molten resin, the quenched resin in the fully amorphous state and as a partially recrystallized resin, and by studying the polarized spectra of oriented films. Such films yield orientation parameters which describe the average orientation of the chain axes in three orthogonal directions: the machine, the transverse, and the thickness directions.

In depicting the orthogonal directions, the machine direction is depicted as the X direction; the transverse direction in the film plane is depicted as the Y direction; and the thickness direction is depicted as the Z direction. For purposes of analyzing polyethylene film for this invention, the a-axis is assigned the band 730 cm$^{-1}$.

Values are determined for $A_X$, $A_Y$ and $A_Z$ which are the absorbance values recorded with the radiation polarized parallel in the X, Y and Z directions, respectively. $A_X$ and $A_Y$ are readily measured with the film plane perpendicular to the beam direction, but for determining $A_Z$, the film must be tilted about the X axis at a known angle to the beam and the absorbance measured with radiation polarized in the Y direction. For the purposes of this invention, $A_Z$ is derived from the tilted film (55° incident angle) absorbance $A_T$ using the relation, $A_Z = 3.1341 A_T - 2.6738 A_Y$.

The parameter $A_O$, defined as $\frac{1}{3}(A_X+A_Y+A_Z)$, is the absorbance expected for the sample, assuming that the orientation of the chains is completely random. $A_O$ is dependent only on the sample thickness and on the phase structure, i.e., the crystalline amorphous phase content. $A_O$ values are also used to provide the orientation parameters $A_I/A_O$ where I is X, Y or Z.

Each $A_I/A_O$ value expresses the average orientation of the transition moment of the mode of interest in the direction of the axis I. Values range from 0 to 3, with 0 indicating a perfect orthogonality and 3 a perfect parallelism of all moments present in the sample with the axis I. A value of 1 indicates random, or no preferred orientation; $A_I$ equals $A_O$, and $A_O$ is by definition the unoriented sample absorbance. Generally, sufficient samples of film must be tested for $A_I/A_O$ ratios using IR trichroism to provide an accuracy of ±0.05. These values are more readily visualized when the orientation parameters are plotted on triangular graph paper, as is known in the art.

The oriented film according to this invention will have the a-axis of a polyethylene crystal's unit cell oriented in the machine direction. Preferably, the crystalline phase of the film will have an $A_X/A_O$ value of between about 1.0 and about 1.5; an $A_Y/A_O$ value of between about 0.7 and about 1.0; and an $A_Z/A_O$ value of between about 0.7 and about 1.0. Most preferably, the crystalline phase will have an $A_X/A_O$ value of between about 1.00 and about 1.30; an $A_Y/A_O$ value of between about 0.85 and about 1.00; and an $A_Z/A_O$ value of between about 0.85 and about 1.00.

The balance of physical properties of the films of this invention include easy handling, good tear resistance, and easy cutterbar tear. These features, which result from the balanced combination of modulus and strength, render the film advantageous for wrapping over sharp corners and resisting abuse in handling; and even when cut or punctured, the stretched film retains its integrity as a wrapping for a packaged load. For the same reasons, the film may also be used in wrapping highly irregular objects. Further, wrapping films made according to the invention generally possess acceptable clarity and other optical characteristics.

The balanced properties of the films of this invention may be quantified by several tests. The puncture-propagation of tear (PPT) test measures, along the machine direction, the resistance of a material to snagging, or more precisely, to dynamic puncture and propagation of that puncture resulting in a tear. Presumably, this test simulates the conditions of the films practical use. The PPT of the present film is greater than 140 mN/$\mu$m.

Two Percent (2%) Secant Modulus is defined as the stress measured in Megapascals (MPa) at a strain of two percent elongation divided by that strain. This procedure determines the tensile properties of plastic film. This test measures the resistance of the film to stretching and, therefore, has a good correlation to ease of handling. Two Percent Secant Modulus is determined using American Society for Testing Materials (ASTM) test ASTM D882. The Two Percent Secant Modulus of the present film is greater than 172 MPa.

The Tribfelner Cutterbar tear, developed by The Dow Chemical Company defines, in joules, the load and energy required to tear a section of film on a standard metal cutterbar. The Tribfelner Cutterbar Test value of the present film is less than 0.4 joules.

The following examples are presented to further illustrate but not limit the scope of this invention. All parts and percentages are by weight.

EXAMPLES 1–4

In a series of four runs, samples of film are prepared by melting and extruding polyethylene having a melt index of about 3 and a density of about 0.93 and by providing 0.5 percent of liquid polyisobutylene.

The resin is extruded from a die in a molten mass and is drawn on a chill roll. The chill roll is commercially available from Egan Machinery Corp, Somerville, N.J., having a surface finish of about 10–15 microinch root mean squared. The chill roll is cooled with water at a temperature of between about 60° C. (141° F.) to about 79° C.(175° F.). The samples of film are pinned to the chill roll by an air knife, also commercially available from Egan Machinery Corp. The air knife is directed at an angle generally normal to the chill roll surface and pins the extrudate with a focus velocity of about 800 meters/minute (m/min). A second chill roll, cooled to about 16° C. (60° F.), is employed to allow the film to be further processed.

Puncture-propagation tear resistance is measured by using a modified version of ASTM D2582. The test was developed by Testing Machines Inc., Mineola, N.Y. The test method is set forth in *Materials Research and Standards*, D. Patterson Jr. and E. B. Winn, May, 1962, pps. 396–400.

A test specimen, approximately 20 cm (8 in) by 20 cm, (8 in), is securely clamped on a tester. The tester consists of a carriage having a 21.3 grams (0.047 lb.) sled, a sharp-pointed probe; and a test stand including: a carriage release mechanism, a scale calibrated in centimeters, a curved sample holder with a tear slot and pneumatically activated clamps, a drop base with guide channels to accommodate the carriage bearing wheels, and a spirit level to level the stand. The carriage is then placed in the fixed release mechanism, with the point of the probe located 51 cm from the initial point of puncture. The carriage is released, it drops and the probe punctures and tears the specimen.

The length of the tear is a measure of the energy absorbed by the specimen in stopping the carriage and probe, i.e., the work done by the probe on the specimen. Since the energy required to puncture the specimen has been found to be negligible in comparison with the energy to propagate the tear, results are expressed in terms of the force required to propagate the tear per unit thickness of the specimen.

Two Percent Secant Modulus is measured by using the methods specified in ASTM D 882. Samples are measured for 2 Percent Secant Modulus with an instrument purchased from the Instron Corporation, 2500 Washington St., Canton, MA 02021. Five determinations are made in the machine and transverse directions with the average of the five reported (rounded off to the nearest 100 psi). Test specimens are 2.5 cm (1.0 in) wide by 15.2 cm (6.0 in) long measured at a jaw span of 10.2 cm (4.0 in).

Haze is defined as that percentage of transmitted light which in passing through the specimen deviates from the incident beam by forward scattering. Haze is determined by the measurement of light passing through a section of film, i.e., generally perpendicularly through the top and bottom surfaces rather than edgewise. A PG-5500 Digital Photometric Unit and clarity meter attachment, commercially available from the Gardner Laboratory Corporation, is employed. Specifically, haze is measured utilizing the techniques of ASTM D1003. The digital photometric unit directs light through the film and measures the intensity entering and traversing the film.

Haze samples are cut in line with machine and transverse directions 7.6 cm square. These square samples of film are placed in a sample holder with a 3.4 cm diameter hole centered 4.0 cm from the holder base. The samples are placed in a Gardner PG-5500 Digital Photometric Unit, with a clarity meter attachment.

Cling qualities are measured by using a modified technique of ASTM D1876, entitled "The Cook Cling Test". The balance method of measuring cling uses a top-loading balance (i.e. Mettler Model P1000) with a sheet metal inclined ramp placed in the balance pan with the top ramp surface (15.2 cm by 25.4 cm) set at 30° to the pan. As the film is unrolled from the core, the side wound toward the core is designated the "inside".

A 12.7 cm (5.0 in) wide by 30.5 cm (12.0 in) long film sample is cut from the film web. This sample is taped on the ramp surface with the inside of the film surface up and with one-half of the sample (long direction) free at the upper end of the ramp. The free end of the film is taped to a wire hanger which in turn is attached to a cart that moves on a 60° angle to the pan. The film is placed directly over the taped portion using a small roller weighing 510 gms and 2.25 cm in diameter to iron out the air between the plies, without creating wrinkles. The cart is then moved at a constant speed (rate of 12.7 cm/min) along the 60° angle of separation. The balance, set at any convenient division at no load, is read to the nearest gram.

Specular gloss is defined as a measure of the shiny appearance of the film. Gloss is measured by using the techniques of ASTM D2457. Samples are placed in a Gardner PG-5500 Digital Photometric Unit, with a 45° Precision Glossmeter attachment. This device measures reflected light from a film surface, also in terms of haze. Gloss samples are stretched over a 10.3 cm diameter circular template that holds the film 0.3 cm above an 8.6 cm diameter black background.

The physical properties of the samples of film are measured and summarized in Table 1.

As seen by the results in Table 1, high strength characteristics, and good handling, determined by PPT, and 2% Secant Modulus tests, respectively, are achieved by quenching the extrudate according to this invention. Specifically, good film properties are achieved when relatively hot chill roll temperatures are employed.

EXAMPLES 5-6

Two samples of film are prepared using the general procedures of Examples 1-4. Samples of film are prepared by melting and extruding a polyethylene resin having a melt index of about 2.5 and a density of about 0.930 and 0.5 percent of liquid polyisobutylene. The molten mass is drawn on a chill roll cooled with water at a temperature of between about 60° C. (140° F.) and about 62° C. (144° F.). The chill roll is commercially available from Egan Machinery Corp, Somerville, N.J., having a surface finish of about 10-15 microinch root mean squared. The air knife is directed at an angle generally normal to the chill roll surface and pins the extrudate with a focus velocity of about 1100 m/min. A second chill roll, cooled to about 16° C. (60° F.), is employed to allow the film to be further processed.

The physical properties of these samples of film are summarized in Table 2.

TABLE 2

| Example | PIB (%) | Air Knife Focus Velocity (m/min) | Chill Roll Temp. (°C.) | Quench Rate (°C./sec) | Avg. Film Gage (μm) | 2% Secant Modulus in the machine direction (MPa) | PPT in the machine direction (mN/μm) | Cling (gm/cm) | Haze (%) | Gloss (%) |
|---|---|---|---|---|---|---|---|---|---|---|
| 5 | 0.5 | 1100 | 62 | 9000 | 14.7 | 179 | 168 | 1.3 | 1.5 | 99.3 |
| 6 | 0.5 | 1100 | 60 | 8200 | 12.0 | 185 | 200 | 0.3 | 1.7 | 98.8 |

As seen by the results in Table 2, high strength characteristics, and good handling, determined by PPT, and 2% Secant Modulus tests, respectively, are achieved by quenching the extrudate according to this invention. Specifically, good film properties are achieved when are relatively strong air knife focus velocties are employed.

EXAMPLES 7-11

Four samples of film are prepared using the general procedures of Examples 1-4. Samples of film are prepared by melting and extruding a polyethylene resin having a melt index of about 2.5 and a density of about 0.930 and about 0.5 percent of liquid polyisobutylene. The molten mass is extruded on a chill roll cooled with water at a temperature of between about 65° C. (151° F.) and about 80° C. (177° F.). The chill roll is commercially available from Egan Machinery Corp, Somerville, N.J., having a surface finish of about 10-15 micro-

TABLE 1

| Example | PIB (%) | Air Knife Focus Velocity (m/min) | Chill Roll Temp. (°C.) | Quench Rate (°C./sec) | Avg. Film Gage (μm) | 2% Secant Modulus in the machine direction (MPa) | PPT in the machine direction (mN/μm) | Cling (gm/cm) | Haze (%) | Gloss (%) |
|---|---|---|---|---|---|---|---|---|---|---|
| 1 | 0.5 | 800 | 60 | 6500 | 12.7 | 186 | 182 | 2.3 | 1.6 | 101.4 |
| 2 | 0.5 | 800 | 65 | 6400 | 13.7 | 198 | 161 | — | — | — |
| 3 | 0.5 | 800 | 70 | 6200 | 12.4 | 199 | 161 | 2.3 | 1.5 | 100.6 |
| 4 | 0.5 | 800 | 79 | 5900 | 12.6 | 203 | 144 | 1.3 | 1.7 | 100.1 | inch root mean squared. The air knife is directed at an angle generally normal to the chill roll surface and pins the extrudate with a focus velocity of between about 1000 m/min and about 1100 m/min. A second chill roll, cooled to about 16° C. (60° F.), is employed to allow the film to be further processed.

The physical properties of these samples of film are measured and summarized in Table 3.

TABLE 3

| Example | PIB (%) | Air Knife Focus Velocity (m/min) | Chill Roll Temp. (°C.) | Quench Rate (°C./sec) | Avg. Film Gage (μm) | 2% Secant Modulus in machine direction (MPa) | PPT in the machine direction (mN/μm) | Cling (gm/cm) | Haze (%) | Gloss (%) |
|---|---|---|---|---|---|---|---|---|---|---|
| 7 | 0.5 | 1000 | 60 | 5400 | 12.5 | 179 | 179 | 2.5 | 1.3 | 102.6 |
| 8 | 0.5 | 1100 | 65 | 6900 | 12.7 | 196 | 193 | — | — | — |
| 9 | 0.5 | 1100 | 71 | 6700 | 12.8 | 177 | 189 | — | — | — |
| 10 | 0.5 | 1100 | 75 | 6600 | 11.7 | 197 | 175 | — | — | — |
| 11 | 0.5 | 1100 | 80 | 6400 | 13.1 | 185 | 154 | 1.3 | 1.8 | 98.4 |

As seen by the results in Table 3, high strength characteristics, and good handling, determined by PPT, and 2% Secant Modulus tests, respectively, are achieved by quenching the extrudate according to this invention. Specifically, good film properties are achieved when a relatively strong air knife focus velocity pins the molten olefinic resin to a relatively hot chill roll.

EXAMPLE 12-15

Four samples of film are prepared using the general procedures employed in Examples 1–4. Samples of film are prepared by melting and mixing polyethylene having a melt index of about 3 and a density of about 0.93 and between about 0.5 and about 1.0 percent of liquid polyisobutylene. The molten mass is drawn on a chill roll cooled with water at a temperature of about 25° C. (77° F.) and about 60° C. (140° F.). The chill roll is commercially available from Egan Machinery Corp, Somerville, N.J., having a surface finish of about 10–15 microinch root mean squared. The air knife is directed at an angle generally normal to the chill roll surface and pins the extrudate with a focus velocity of about 700 m/min. A second chill roll, cooled to about 16° C. (60° F.), is employed to allow the film to be further processed.

The physical properties of these samples of film are summarized in Table 4.

TABLE 4

| Example | PIB (%) | Air Knife Focus Velocity (m/min) | Chill Roll Temp. (°C.) | Quench Rate (°C./sec) | Avg. Film Gage (μm) | 2% Secant Modulus in machine direction (KPa) | PPT in machine direction (mN/μm) | Cling (gm/cm) | Haze (%) | Gloss (%) |
|---|---|---|---|---|---|---|---|---|---|---|
| 12 | 0.5 | 700 | 25 | 15600 | — | 205 | 161 | — | — | — |
| 13 | 0.5 | 700 | 60 | 9000 | — | 207 | 144 | — | — | — |
| 14 | 1.0 | 700 | 60 | 9000 | — | 210 | 140 | — | — | — |
| 15 | 1.0 | 700 | 26 | 15600 | — | 172 | 186 | — | — | — |

As seen by the results in Table 4, high strength characteristics and good handling, determined by PPT, and 2% Secant Modulus tests, respectively, are achieved by quenching the extrudate according to this invention. Specifically, good film properties are achieved when a relatively weak air knife focus velocity pins the extrudate to a relatively cool chill roll.

EXAMPLES 16-17

Three samples of film are prepared using the general procedures employed in Examples 1–4. Samples of film are prepared, however, by melting and extruding polyethylene containing up to 30 percent recycle having a melt index of about 3 and a density of about 0.93 and by providing between about 0.6 percent and about 1.0 percent liquid polyisobutylene. The polyethylene is recycled into pellet form, without melting, by chopping scrap polyethylene in a grinder and densified using a densifier, using commercially available units.

The molten mass is drawn on a chill roll cooled with water at a temperature of between about 71° C.(160° F.) to about 72° C.(162° F.). The air knife is directed at an angle generally normal to the chill roll surface and pins the extrudate with a focus velocity of between about 1000 m/min and 1200 m/min. A second chill roll, cooled to about 16° C. (60° F.), is employed to allow the film to be further processed.

The physical properties of these samples of film are summarized in Table 5.

TABLE 5

| Example | Recycle (%) | PIB (%) | Air Knife Focus Velocity (m/min) | Chill Roll Temp. (°C.) | Quench Rate (°C./sec) | Avg. Film Gage (μm) | 2% Secant Modulus in the machine direction (KPa) | PPT in the machine direction (mN/μm) | Cling (gm/in) | Haze (%) | gloss (%) |
|---|---|---|---|---|---|---|---|---|---|---|---|
| 16 | 30 | 1.0 | 1000 | 71 | 8300 | 14.5 | 179 | 179 | — | — | — |

TABLE 5-continued

| Example | Recycle (%) | PIB (%) | Air Knife Focus Velocity (m/min) | Chill Roll Temp. (°C.) | Quench Rate (°C./sec) | Avg. Film Gage (μm) | 2% Secant Modulus in the machine direction (KPa) | PPT in the machine direction (mN/μm) | Cling (gm/in) | Haze (%) | gloss (%) |
|---|---|---|---|---|---|---|---|---|---|---|---|
| 17 | 15 | 0.6 | 1200 | 72 | 10500 | 13.0 | 183 | 179 | 2.5 | 1.4 | 103.5 |

As seen by the results in Table 5, high strength characteristics and good handling, determined by PPT and 2% Secant Modulus tests, respectively, are achieved by quenching the extrudate according to this invention. Specifically, polyethylene containing up to 30 percent recycle provides film properties consistent with the good film properties of Examples 1-15.

EXAMPLES 18-19

The molecular orientation and cutterbar tear of the films in Examples 7 and 9 are determined by IR trichroism and a cutterbar tear test, respectively.

Using IR Trichroism, spectra are recorded using a Perkin-Elmer 983 grating instrument at 2 cm$^{-1}$ nominal resolution. A wire-grid polarizer mounted in a motorized mount (at the entrance slit of the monochromator) with precise, external control provides very efficient polarization counts.

Cutterbar properties of the film are evaluated by the Tribfelner Cutterbar Test. The test simulates the tear of film by hand. Observation of the film energy values obtained permit determination of how readily a length of film may be withdrawn from a conventional household carton and cut off on the cutterbar of the carton.

The test is conducted by securing a household carton with a conventional cutterbar in a receptacle, e.g., a ring stand, such that the cutterbar is mounted at a 45° angle to the horizontal. A 22.9 cm (9 in) length of film, approximately 30.5 cm (12 in) wide, is pulled from the carton so that it extends over the cutterbar. A carriage is clamped to and centered on a corner of the film 21.1 cm (8.3 in) from the edge of the cutterbar. The carriage consists of an 18 gram pinch clamp attached by a 31.0 cm (12.2 in) string to a hanger weight. The load, initially 10 grams plus the weight of the clamp, is then raised to a height of 25.4 cm (10 in) and dropped on the film. The procedure is repeated incrementally increasing the weight of the load by 5 grams until the load is 30 grams, after which it is increased in 1 gram increments. After the film tears, remove the last weight increment added and repeat the procedure 10 times. The weight of the load causing the film tear is called the "drop weight".

To calculate the energy values of the film (1) multiply the average drop weight of the 10 trials by 25.4 (the drop height in centimeters); (2) multiply the average load weight (the weight of the clamp plus the average drop weight for the ten trials) by 36.8 (the vertical length in centimeters of the fall of the weight during the tear); and (3) add the values obtained in (1) and (2) to obtain the total energy, in joules, required to tear the film.

The results of this test are presented in Table 6.

TABLE 6

| Example | a-axis band orientation parameters | | | Cutterbar Tear (Joules) |
|---|---|---|---|---|
| | $A_X/A_O$ | $A_Y/A_O$ | $A_Z/A_O$ | |
| 18 | 1.13 | 0.92 | 0.95 | 0.3 |
| 19 | 1.06 | 0.94 | 1.00 | 0.3 |

As seen by the results in Table 6, films made according to the process parameters of this invention have crystalline unit cells with an a-axis highly orientated in the machine direction. Hence, the films of this invention possess good cutterbar tear properties as well as good handling and strength characteristics.

While certain representative embodiments, Examples and details have been shown for the purposes of illustrating the invention, it will be apparent to those skilled in the art that various changes in the applications can be made therein without departing from the spirit and scope of the invention. For example, the use of other olefins or blends, or the same resin with varying additives may be encompassed by the scope of the claims.

I claim:

1. A transparent plastic film having balanced physical properties comprising (1) a homopolymer of ethylene having a density of between about 0.92 to about 0.94 and a melt index of between about 1 decigrams per minute to about 6 decigrams per minute, said film having a two percent secant modulus of greater than 172 MPa and less than 210 MPa; and a Puncture, Propagation, and Tear resistance of greater than 140 mN/μm and less than 200 mN/μm;

wherein the film has an amorphous phase and a crystalline phase with polyethylene crystalline units, said polyethylene crystalline units having an a-axis orientation, as measured by IR trichroism, of $A_X/A_O$ between about 1.0 to 1.5; $A_Y/A_O$ between about 0.7 to 1.0; and $A_Z/A_O$ between about 0.7 to 1.0.

2. The film of claim 1 further comprising a cling additive in an amount of between about 0.2 to about 2.0 weight percent.

3. The film of claim 1 further comprising an antioxidant in an amount of between 200 to about 800 parts per million based on the weight of the ethylene.

4. The film of claim 1, wherein the homopolymer of ethylene is low density polyethylene.

* * * * *